United States Patent [19]

Miyazaki et al.

[11] Patent Number: 5,037,692
[45] Date of Patent: Aug. 6, 1991

[54] MULTILAYER STRUCTURE

[75] Inventors: Yoshitomo Miyazaki; Jun Nishimura; Takashi Katoh, all of Yamaguchi, Japan

[73] Assignee: Mitsui Petrochemical Industries, Ltd., Tokyo, Japan

[21] Appl. No.: 340,452

[22] Filed: Apr. 19, 1989

[30] Foreign Application Priority Data

Apr. 21, 1988 [JP] Japan .................................. 63-99244

[51] Int. Cl.$^5$ ............................................... B32B 7/00
[52] U.S. Cl. ..................................... 428/252; 428/246; 428/234; 428/253; 428/282; 428/284; 428/286; 428/287; 428/297; 428/298; 428/300
[58] Field of Search ............... 428/246, 253, 284, 300, 428/234, 286, 245, 252, 287, 289, 297, 298, 282

[56] References Cited

U.S. PATENT DOCUMENTS 4,230,762 10/1980 Iwasaki et al. ...................... 428/234

FOREIGN PATENT DOCUMENTS 0115192 8/1984 European Pat. Off. .

Primary Examiner—James J. Bell
Attorney, Agent, or Firm—Birch, Stewart, Kolasch & Birch

[57] ABSTRACT

A multilayer structure which provides high strength under low distortion or elongation conditions without impairing the draining properties of conventional structures or the ease with which they can be transported or be made to conform to the earth surfaces over which they are laid. The multilayer structure of the invention comprises knitted or woven fabric layers and non-woven fabric layers multilaid together; the knitted or woven fabric layers consist of synthetic resin multifilaments oriented at least in one direction and having a tensile elastic modulus of 20 GPa or more, preferably 50 GPa or more, and a tensile strength of 1.2 GPa or more, preferably 1.5 GPa or more, while the non-woven fabric layers consist of long or short synthetic resin fibers arranged at random.

18 Claims, No Drawings

MULTILAYER STRUCTURE

BACKGROUND OF THE INVENTION

The present invention relates to a multilayer structure which displays the same draining properties as prior art non-woven fabrics and high strength under low distortion or elongation (15% or less) conditions.

In construction works undertaken in the field of civil engineering, in particular, in anti-flood afforestation works, riparian works, road construction works, or the construction of structures on soft ground, synthetic resin drainage materials or reinforcing materials are sometimes spread over the bottom or inner zone of an earth structure or a building for the purpose of improving the operational efficiency and stability after construction has been completed.

However, none of these synthetic resin materials excel in both draining and reinforcing properties, each only satisfying one or the other to an adequate extent. Some materials may be regarded as satisfactory in both aspects to a certain degree. In such cases, however, the significance of one of these two categories of properties is only like that of an accessory with respect to the other.

In earth structures or building bases, any deformation of a structure due to distortion of about 5% to 15% is judged to be indicative of its breakdown or its ceasing to function as designed. Synthetic resins exhibiting a distortion rate in the range 5% to 15% (as shown by the results of a distortion test as set forth in JIS L-1096) are conventionally employed as reinforcing materials. The problem with these conventionally used synthetic resin materials which have a distortion rate in the above range and which exhibit a high strength is that they only provide poor draining properties.

SUMMARY OF THE INVENTION

It is accordingly an object of this invention to provide a laminated structure which provides high strength under low distortion conditions without impairing the draining properties of conventional non-woven fabrics or the ease with which they can be transported or be made to conform to the earth surfaces over which they are laid.

To attain the above object, this invention provides a multilayer structure comprising knitted or woven fabric layers and non-woven fabric layers multilaid together; the knitted or woven fabric layers consist of synthetic resin multifilaments oriented at least in one direction and having a tensile elastic modulus of 20GPa or more, preferably 50GPa or more, and a tensile strength of 1.2GPa or more, preferably 1.5GPa or more, while the non-woven fabric layers consist of long or short synthetic resin fibers arranged at random.

DESCRIPTION OF THE PREFERRED EMBODIMENTS (A) The synthetic resin multifilaments used in the knitted or woven fabric layers of the laminated structure of this invention are multifilaments which have an initial tensile elastic modulus of 20GPa (gigapascal) or more, preferably 50GPa or more, and a tensile strength of 1.2GPa or more, preferably 1.5GPa or more, as measured in accordance with the test method of JIS L-1013. Any deviation of the initial tensile elastic modulus and the tensile strength from the above-mentioned ranges will result in synthetic resin multifilaments whose strength is unsatisfactory for the purposes of the reinforcing materials of this invention.

The monofilaments making up each of the above multifilaments may consist of filaments made of synthetic resins of the polyamide type, polyester type, polyacrylonitrile type, polyvinylalcohol type, polyolefine type, polystyrene type, etc. Of these, synthetic resins of the polyolefine type, such as polyethylene and polypropylene are preferable. In particular, drawn products of ultra-high molecular polyethylene are most preferable. Such drawn products can be produced, for example, by the methods disclosed in Japanese Patent Laid-Opens No. 59-187614 and No. 59-130313.

The multifilaments may consist of unwoven threads or ciliary threads made of materials selected from among the above-mentioned synthetic resins. By "unwoven threads" is meant here those threads obtained by regularly or irregularly unweaving films or tapes of a synthetic resin with a carding machine. The term "ciliary threads" means bulky, spun-thread-like threads which have no network structure and which can be obtained by controlling the fiber distribution in each component fiber section.

The fineness of the multifilaments used in this invention is preferably in the range 300 to 2500 denier, and in particular, in the range 500 to 2000 denier.

These multifilaments are oriented at least in one direction of the texture of a knitted or woven fabric, thereby enhancing the strength of the texture in that direction. The texture type of the woven fabric may be plain weave, stain weave, twill weave, or various other texture types to which these basic texture types are applied.

When multifilaments of the above-specified type are oriented in one direction, the filaments to be arranged in other directions may be of some other type, such as multifilaments or monofilaments whose tensile elastic modulus and tensile strength are not in the above-mentioned ranges. It is also possible to arrange multifilaments whose tensile elastic modulus and tensile strength are not in the above-mentioned ranges not only in a single but in a plurality of directions as, for example, warp and weft. This arrangement helps to enhance the strength in any particular direction.

The mass (weight/area ratio) of a knitted or woven fabric layer in which multifilaments of the above-specified type are arranged in one direction is preferably at least 50 to 1000g/m$^2$, and in particular, 100 to 500g/m$^2$.

(B) The non-woven fabric layers of this invention in which long or short synthetic resin fibers are arranged at random may be non-woven fabric layers composed of long fibers (including continuous fibers) or short fibers made of materials selected from among polyamide fibers, polyester fibers. polyacrylonitrile fibers, polyvinylalcohol fibers. polyvinyl chloride fibers, polyvinylidene chloride fibers, polyethylene fibers, polypropylene fibers, polystyrene fibers, etc. In particular, the layers are preferably made of a nonwoven fabric of polyamide fibers, polyester fibers, polyvinylalcohol fibers, polyethylene fibers, or polypropylene fibers.

While the above-mentioned fibers vary in draft ratio and drawing factor, those having a high strength and a low drawing factor would be preferable. In view of the fact that a mechanical confounding method using a needle punch or the like is employed, as will be described later, long fibers are more preferable than short ones. Normally, the long or short fibers in the nonwoven fabric layers are formed by means of melt spinning. As a result, the fiber groups are randomized, and are mended with screens or the like to form webs. If so desired, a thermal stabilizer, an antioxidant, an ultraviolet radiation absorbent, a pigment, a flame retarder, a surface active agent, etc. may be added to the molten material during, before and after melt spinning and web forming, or may be applied to the surface of the formed fibers. The fineness of the long or short fibers in non-woven fabric layers thus formed is preferably in the range 50 to 1000g/m$^2$, and in particular, in the range 100 to 500g/m$^2$.

(C) The following structures may be indicated as examples of multilayer structures consisting of layers of a knitted or woven fabric and those of a non-woven fabric:

(1) A bilaminar structure in which one is superposed on the other;

(2) A triplex structure in which a knitted or woven fabric layer is sandwiched between non-woven fabric layers;

(3) A triplex structure in which a non-woven fabric layer is sandwiched between knitted or woven fabric layers; and (4) A multilayer structure in which structures of the above type (1) are laid on each other. Of these, a triplex structure according to (2) is particularly preferable.

(D) A knitted or woven fabric layer and a non-woven fabric layer may be connected to each other by means of a needle punch, a water jet punch, an ultrasonic welder, a high-frequency welder, heat embossing, etc. When using a needle punch, a satisfactory connection between layers can be attained if the needle punch penetrates each layer 30 to 150 times, preferably, 50 times or more, per 1 cm$^2$. The needle depth of the needle punch is preferably 8 to 15mm, and in particular, 10 to 14mm. Since at least one direction component of the knitted or woven fabric layer in the multilaid structure thus obtained consists of multifilaments, the degeneration in initial tensile strength due to the needle punch is relatively low in this multilayer structure, as compared with flat-type structures. It also displays excellent water permeability. Furthermore, by performing surface treatment of each layer with a nonionic surface active agent, such as polyoxyethylene alkyl ether or polyoxyethylene alkyl phenyl ether, before or during the needle punch operation, the degree of fiber mutilation by the needle punch in each layer will be mitigated, and deterioration in the initial tensile strength will be prevented more reliably. This is also advantageous in that each layer is made hydrophilic, which improves its water permeability.

The connections between layers through thermal fusion effected by means of the above-mentioned welders or heat embossing may be partial connections. To establish firm connection between layers, it is desirable that the knitted or woven fabric layer and the non-woven fabric layer be made of the same synthetic resin, or, if different, synthetic resins which are compatible with each other.

The tensile strength of this product should be such that it can be indicated by a maximum load of 4.5tf/m or more when the extensional distortion in at least one direction as measured by a test conducted in accordance with the cut strip method of JIS-1096 is 15% or less. Its water permeability coefficient is in the range $1\times10^1$ to $1\times10^2$ cm/sec in the inplane direction (horizontal direction) and $1\times10^0$ to $1\times10^2$ cm/sec in the vertical direction.

As described above, the mulitlayer structure of this invention provides a more satisfactory initial tensile strength and water permeability (draining property) than conventional laminated sheets used as materials in the field of civil engineering. Furthermore, since the non-woven fabric layers serve as cushions to protect the knitted or woven fabric layers, they not only provide a high tensile strength and a good elongation percentage but also display resistance under repeated loading, thereby maintaining its high performance as a sheet material for use in civil engineering works for long periods of time. These characteristics make the multi-layer structure of this invention suited to use as a foundation reinforcing material for stabilizing banking and weak ground. In addition, since it exhibits excellent load stress distributing properties when used in road foundations, it can also be used for promoting the consolidation of weak ground in vertical draining works, etc. Apart from this, it can also be used as a material for use in draining percoated water, ground water or the like, or as an anti-drafting or anti-scouring material used for protecting the shores of rivers, seas, etc. Furthermore, it is also suited for use as an anti-mud-pumping material for the ground beneath railroads where resistance to sediment separation and repeated loading is required. It will also find a variety of uses in civil engineering, such as use as a sheet for mortar or beton spraying work, as a material for preventing the clogging of culverts (drainage piping below ground), as a draining or insulating material for tunnels, as a material for preventing oil leakage from pipelines, and as a base material impregnated with asphalt for use as a cut-off or water-proof sheet.

EXAMPLE

An example of the laminated structure of this invention will be shown below.

A laminated structure is formed under the following conditions, and is subjected to a tensile strength test:

(Non-Woven Fabric):

A long-fiber non-woven fabric made of polypropylene;

* mass (weight/area ratio) : about 130g/m$^2$ (Knitted or Woven Fabric):

A plain-weave fabric in which drawn multifilaments of ultra-high molecular polyethylene having a fineness of 1000D are oriented in one direction, seven per inch, as warp, and in which unwoven threads of monofilaments made of polypropylene are provided as weft.

* Strength of the drawn multifilaments: 25g/D (Forming Conditions):

A knitted or woven fabric sheet is sandwiched between two non-woven fabric sheets, connecting them together by means of a needle punch.

* Number of needle punches: 50/m$^2$
* Needle depth: 14mm (Test Method):

The tensile strength of the knitted or woven fabric in the warp direction is measured by applying load to the multilayer structure in accordance with the cut split method of JIS-1096.

The maximum load is 4.6tf/m, and the elongation distortion under the maximum load is 5.0%.

What is claimed is:

1. A multi-layer structure comprising knitted or woven fabric layers and non-woven fabric layers multilaid together, said knitted or woven fabric layers consisting of synthetic resin multifilaments arranged at least in one direction and having a tensile elastic modulus of 20GPa or more, and a tensile strength of 1.2GPa or more, and said non-woven fabric layer consisting of long or short synthetic resin fibers arranged at random and having a maximum load of 4.5tf/m or more when the extension distortion in at least one direction as measured by a test conducted in accordance with the cut strip method of JIS-1096 is 15% or less.

2. The multilayer structure of claim 1, wherein the tensile modulus is 50GPa or more.

3. The multilayer structure of claim 1, wherein the tensile modulus is 1.5GPa or more.

4. A multi-layer structure comprising knitted or woven fabric layers and non-woven fabric layers multilaid together, said knitted or woven fabric layers comprising synthetic resin multifilaments having a tensile elastic modulus of 20GPa or more and a tensile strength of 1.2GPa or more, and said non-woven fabric layers comprising long or short synthetic resin fibers arranged at random and having a maximum load of 4.5tf/m or more when the extension distortion in at least one direction as measured by a test conducted in accordance with the cut strip method of JIS-1096 is 15% or less.

5. The multilayer structure of claim 4, wherein the multifilaments comprise monofilaments made of synthetic resins selected from the group consisting of polyamide, polyester, polyacrylonitrile, polyvinylalcohol, polyolefine and polystyrene.

6. The multilayer structure of claim 5, wherein the monofilaments are made of synthetic resins selected from the group consisting of polyolefine, polyethylene and polypropylene.

7. The multilayer structure of claim 5, wherein the monofilaments are made of ultra-high molecular weight polyethylene.

8. The multilayer structure of claim 4, wherein the multifilaments have a fineness of 300 to 2500 denier.

9. The multilayer structure of claim 4, wherein the mass of said knitted or woven fabric layers is 50 to 1000 $g/m^2$.

10. The multilayer structure of claim 4, wherein said non-woven fabric layers comprising long or short synthetic resin fibers arranged at random are made of materials selected from the group consisting of polyamide fibers, polyester fibers, polyacrylonitrile fibers, polyvinylalcohol fibers, polyvinyl chloride fibers, polyvinylidene chloride fibers, polyethylene fibers, polypropylene fibers and polystyrene fibers.

11. The multilayer structure of claim 10, wherein said non-woven fabric layers comprising long or short synthetic resin fibers arranged at random are made of materials selected from the group consisting of polyamide fibers, polyester fibers, polyvinylalcohol fibers, polyethylene fibers, and polypropylene fibers.

12. The multilayer structure of claim 4, wherein the fineness of said long or short fibers in said non-woven fabric layers is in the range 50 to 1000 $g/m^2$.

13. The multilayer structure of claim 12, wherein said fineness is in the range of 100 to 500 $g/m^2$.

14. The multilayer structure of claim 4, wherein a layer of a knitted or woven fabric is superimposed on a non-woven fabric.

15. The multilayer structure of claim 4, wherein a non-woven fabric is superimposed on a knitted or woven fabric.

16. The multilayer structure of claim 4, wherein a knitted or woven fabric layer is sandwiched between non-woven fabric layers.

17. The multilayer structure of claim 4, wherein a non-woven fabric layer is sandwiched between knitted or woven fabric layers.

18. The multilayer structure of claim 4, having a water permeability coefficient in the range $1 \times 10^1$ to $1 \times 10^2$ cm/sec in the inplane direction (horizontal direction) and $1 \times 10^0$ to $1 \times 10^2$ cm/sec in the vertical direction.

* * * * *